United States Patent [19]

Thiel et al.

[11] Patent Number: 4,884,196

[45] Date of Patent: Nov. 28, 1989

[54] SYSTEM FOR PROVIDING DATA FOR AN EXTERNAL CIRCUIT AND RELATED METHOD

[75] Inventors: Geoffrey L. Thiel, Richmond; Douglas H. Hodgkiss, Sheppston, both of United Kingdom; Hisanori Tohara, Otawara, Japan

[73] Assignee: Kabushiki Kaisha Toshiba, Kanagawa, Japan

[21] Appl. No.: 915,062

[22] Filed: Oct. 6, 1986

[30] Foreign Application Priority Data

Oct. 7, 1985 [JP] Japan ................. 60-221758

[51] Int. Cl.⁴ .................... G06F 15/16; G06F 9/24
[52] U.S. Cl. ........................................ 364/200
[58] Field of Search ............. 364/200 MS File, 300, 364/900 MS File

[56] References Cited

U.S. PATENT DOCUMENTS

| | | | |
|---|---|---|---|
| 3,859,636 | 1/1975 | Cook | 364/200 |
| 4,027,293 | 5/1977 | Lincoln et al. | 364/200 |
| 4,103,327 | 7/1978 | Dimmick | 364/200 |
| 4,131,941 | 12/1978 | Siegel et al. | 364/200 |
| 4,179,731 | 12/1979 | Yamazaki | 364/200 |
| 4,179,736 | 12/1979 | Wilhite | 364/200 |
| 4,179,737 | 12/1979 | Kim | 364/200 |
| 4,197,579 | 4/1980 | Otis, Jr. et al. | 364/200 |
| 4,251,862 | 2/1981 | Murayama | 364/200 |
| 4,253,142 | 12/1981 | Bavoux et al. | 364/200 |
| 4,310,880 | 1/1982 | Gehman | 364/200 |
| 4,373,180 | 2/1983 | Linde | 364/200 |
| 4,379,328 | 4/1983 | Catiller et al. | 364/200 |
| 4,390,946 | 6/1983 | Lane | 364/200 |
| 4,398,244 | 8/1983 | Chu et al. | 364/200 |
| 4,438,492 | 3/1984 | Harmon, Jr. et al. | 364/200 |
| 4,439,827 | 3/1984 | Wilkes | 364/200 |
| 4,466,834 | 12/1984 | Kobayashi et al. | 364/200 |
| 4,467,415 | 8/1984 | Ogawa | 364/200 |
| 4,470,109 | 9/1984 | McNally | 364/200 |
| 4,472,772 | 9/1984 | Flora | 364/200 |
| 4,521,858 | 6/1985 | Kraemer et al. | 364/200 |
| 4,541,045 | 9/1985 | Kromer, III | 364/200 |
| 4,586,127 | 4/1986 | Horvath | 364/200 |
| 4,586,130 | 4/1986 | Butts, Jr. et al. | 364/200 |
| 4,613,935 | 9/1986 | Couleur | 364/200 |
| 4,677,549 | 6/1987 | Katsura et al. | 364/200 |
| 4,709,324 | 11/1987 | Kloker | 364/200 |
| 4,719,565 | 1/1988 | Moller | 364/200 |
| 4,754,393 | 6/1988 | Kitson et al. | 364/200 |

FOREIGN PATENT DOCUMENTS

0157635 8/1985 Japan .
0131039 6/1986 Japan .

OTHER PUBLICATIONS

"Build a Microcomputer", Chap. II, Microprogrammed Design, Advanced Micro Devices, pp. 10–11 and 21–29 (1978).

Primary Examiner—Andrew J. James
Assistant Examiner—Viet Nguyen
Attorney, Agent, or Firm—Finnegan, Henderson, Farabow, Garrett and Dunner

[57] ABSTRACT

A system for sequentially providing external circuit data for an external circuit comprising: a memory having a plurality of memory locations identified by addresses, each memory location containing an instruction comprising external circuit data and memory location data, the memory further comprising an address input terminal for currently accessing one of the memory locations in response to receipt of the address for that memory location at the address input terminal; a sequencer, coupled to the memory to receive memory location data from the currently addressed one of the memory locations, for selecting the address of another of the memory locations in response to the next memory location data; a first register, coupled between the sequencer and the address input terminal of the memory to receive the address of the other of the memory locations from the sequencer for storing the address selected by the sequencer to make the address available at the address input terminal of the memory to access the other of the memory locations, after the storing; and a second register, coupled between the memory and the external circuit, for storing the external circuit data of the currently accessed memory location for use, after the storing, by the external circuit. A related method is also provided.

11 Claims, 8 Drawing Sheets

| STAGE | | | | | | | |
|---|---|---|---|---|---|---|---|
| SEQUENCER 24 | --- | N | N+1 | N+2 | N+3 | N+4 | N+5 | --- |
| CONTROL STORE 20 | --- | N | N+1 | N+2 | N+3 | N+4 | N+5 | --- |
| PIPELINE REGISTER 22 | --- | N | N+1 | N+2 | N+3 | N+4 | N+5 | --- |
| | --- | N-1 | N | N+1 | N+2 | N+3 | N+4 | --- |

FIG. 3 (PRIOR ART)

| STAGE | | | | | | | |
|---|---|---|---|---|---|---|---|
| SEQUENCER 24 | --- | N | N+1 | N+2 | N+3 | N+4 | N+5 | --- |
| PIPELINE REGISTER 28 | --- | N-1 | N | N+1 | N+2 | N+3 | N+4 | N+5 | --- |
| CONTROL STORE 20 | --- | N-1 | N | N+1 | N+2 | N+3 | N+4 | --- |
| PIPELINE REGISTER 22 | --- | N-2 | N-1 | N | N+1 | N+2 | N+3 | --- |

FIG. 4 (PRIOR ART)

| STAGE | | | | | | | | |
|---|---|---|---|---|---|---|---|---|
| 1ST Ppln REG 64 TO 76 | -- | N | N+1 | N+2 | N+3 | N+4 | N+5 | -- |
| CONTROL STORE 60 TO 70 | -- | N | N+1 | N+2 | N+3 | N+4 | N+5 | -- |
| CONTROL STORE 60 TO 72 | -- | N | N+1 | N+2 | N+3 | N+4 | N+5 | -- |
| CONTROL STORE 60 TO 80 | -- | N | N+1 | N+2 | N+3 | N+4 | N+5 | -- |
| SEQUENCER UNIT 62 | -- | N | N+1 | N+2 | N+3 | N+4 | N+5 | -- |
| 2ND Ppln REG 68 TO 78 | -- | N-1 | N | N+1 | N+2 | N+3 | N+4 | -- |
| 2ND Ppln REG 68 TO 82 | -- | N-1 | N | N+1 | N+2 | N+3 | N+4 | -- |

CURRENT ADDRESS

BRANCH COMMAND

JUMP ADDRESS

STATUS SELECT COMMAND & CONTROL COMMAND

CURRENT ADDRESS

STATUS SELECT COMMAND

CONTROL COMMAND

FIG. 8

TO EXTERNAL OPERATING CIRCUIT 90

SYSTEM FOR PROVIDING DATA FOR AN EXTERNAL CIRCUIT AND RELATED METHOD

BACKGROUND OF THE INVENTION

I. Field of the Invention

This invention relates generally to a system and related method for sequentially providing data for an external circuit, and more specifically to a system and related method for sequentially providing an external circuit with operation instructions for use in controlling the operation of the external circuit.

II. Background Information

Systems for sequentially providing external circuit data for an external circuit which are known include a single-register system, referred to as a single pipeline sequencer, and a double-register system, referred to as a double pipeline sequencer. Conventional single and double pipeline sequencers may be used, for example, to sequentially provide an external circuit comprising an operating system with operating instructions.

As shown in the FIG. 1 depiction of the prior art, the typical single pipeline sequencer 100 includes control store memory 0, pipeline register 22, sequencer unit 24, and status select unit 26. The single pipeline sequencer 100 also includes data links 30, 32, 34, 36, 38, 40 and 42. Control store memory 20 is connected to pipeline register 22 by data link 30. Pipeline register 22 is coupled to sequencer unit 24 by data links 32 and 34; to status select unit 26 by data link 36; and to an external operating circuit 50 by data link 38. Status select unit 26 is coupled to sequencer unit 24 by data link 40. Sequencer unit 24 is coupled to control store memory 20 by data link 42.

Control store memory 20 stores sets of instructions, i.e., programs, at locations, each location having an address. Each location in control store memory 20 contains a program line or instruction which includes both external circuit data comprising a control command, and memory location data comprising a branch command, a jump address, and a status select command. Sequencer unit 24 selects a memory location in control store memory 20 to be currently accessed and therefore available to be transferred to pipeline register 22.

In response to a clock pulse from an external timing generator 52, the instruction in the control store memory location selected by sequencer unit 24 (including the control command, branch command, jump address and status select command) is transferred from control store memory 20 to pipeline register 22.

The instruction is then immediately transferred from pipeline register 22. Specifically, the control command of the instruction is immediately transferred to external operating circuit 50 over data link 38. The branch command and jump address are transferred to sequencer unit 24 over data links 32 and 34, respectively. The status select command is transferred to status select unit 26 over data link 36.

The control command specifies an operation or operations to be performed by external operating circuit 50 and directs operating circuit 50 to perform the specified operations. At the same time that pipeline register 22 transfers a control command to external Operating circuit 50, status select unit 26, which typically receives status signals 48 from external operating circuit 50, selects one of status signals 48 received from external operating circuit 50 in response to the status select command transferred to status select unit 26 from pipeline register 22. The selected status signal is then presented to sequencer unit 24 over data link 40.

Sequencer unit 24 receives the selected status signal from status select unit 26, and a branch command and jump address from pipeline register 22. Using the status signal, branch command and jump address received, sequencer unit 24 selects an address of a location in control store memory 20 which contains a next instruction containing operations to be performed by external operating circuit 50. Selection of the control store memory location containing the next instruction by sequencer unit 24 is operative to access the next instruction in control memory 20 and to make the instruction available for transfer to pipeline register 22 upon receipt by control store 20 of the next clock pulse from external timing generator 52.

FIG. 3 is a chart illustrating the operation of the prior art single pipeline sequencer of FIG. 1. As shown, at any given stage of operation the control store memory location currently accessed is that location, the address of which has been selected by sequencer unit 24. Pipeline register 22 contains information from the previous memory location accessed. Pipeline register 22 receives the instruction at the currently accessed location upon receipt by sequencer unit 24 of the clock pulse from external timing generator 52.

An example of a program segment with instructions for successive selection by conventional single pipeline sequencer 100 is set forth below (Table 1). The program segment shows memory addresses for the locations in control store memory 20, and the instruction lines contained at each location. Status select commands, where included as part of an instruction, branch commands, and jump addresses are shown.

TABLE 1

| Address | Status Select Command | Branch Command | Jump Address | |
|---------|----------------------|----------------|------|-------|
|         |                      |                | True | False |
| :       | :                    | :              |      |       |
| 148     | —                    | CONT           | 149  |       |
| 149     | —                    | CONT           | 150  |       |
| 150     | CNZ                  | JMP            | 151  | 170   |
| 151 or  | :                    | :              |      |       |
| 170     |                      |                |      |       |
| :       | :                    | :              |      |       |

The first instruction of the exemplary program segment is located at control store memory location 148. Sequencer unit 24, when provided the CONT (meaning continue) branch command, selects the jump address in the "true" column and reads control store memory 20 to transfer the instruction at location 149 to pipeline register 22. A status select command is not specified for an instruction the branch command of which is a CONT. The instruction at location 149 is similar to the instruction at location 148. The next instruction transferred from control store memory 20 after the instruction at 149 is, therefore, the instruction at location 150.

The branch command for the instruction at location 150 is a JMP (meaning JUMP). Accordingly, sequencer unit 24 determines the location of the next instruction in accordance with a status signal from status select unit 26. The status select command is a CNZ (meaning CONDITION ZERO). If the "zero" condition is met, the status signal from status select unit 26 indicates a "true" condition. Alternatively, if the "zero" condition is not met, the status signal indicates a "false" condition. Sequencer unit 24 selects either jump address 151 or 170 depending on whether the status signal received from status select unit 26 indicates a "true" or "false" condition, respectively.

The selection of each address indicative of the next instruction to be transferred from control store memory 20 is based on the status select command, branch command and jump address appearing in the instruction last transferred from control store memory 20. It is possible to base the selection of the address for the next instruction on the memory location information, i.e., status select command, branch command and jump address contained in the last instruction transferred from control store memory since at the moment of transfer from control store memory 20 the memory location information (status select command, branch command, jump address) is immediately available at sequencer unit 24 through pipeline register 22. As a consequence, sequencer unit 24 has the information necessary to select the next successive instruction at the instant it becomes necessary to select a next location in control store memory 20 for access.

Although control commands are not shown in Table 1 for the control store memory locations, a control command exists for each location. The control commands are transferred to external operating circuit 50 when the status select command, branch command and jump address are transferred from control store memory 20. The control commands are executed by external operating circuit 0 of FIG. 1 while the address of the location of the next instruction is selected by sequencer unit 24.

The speed with which the single pipeline sequencer 100 operates is controlled by external timing generator 52. The length of time between clock pulses generated by external timing generator 52 is set in accordance with the system steps which must be performed between pulses. Between pulses, an instruction must be transferred to pipeline register 22 from control store memory 20, and from pipeline register 22 as described above (status select command to status select unit 26; branch command and jump address to sequencer unit 24; control command to external operating circuit 50). Also in the interval between pulses, a status signal must be selected by status select unit 26 and transferred to sequencer unit 24; sequencer unit 24 must select the address of the memory location containing the next instruction; and the next instruction must be accessed and made available for transfer from control store memory 20 to pipeline register 22. Because the steps, between and including the transfer of the instruction from control store memory 20 and the accessing of a next instruction for transfer from control store memory 20, must occur in the interval between pulses, a fixed limit exists as to how short the interval between pulses can be. That is, the operation speed for the sequencer system has a fixed time limit which cannot be exceeded.

The interval between pulses is shorter, i.e., the speed at which the system for providing external circuit data provides external operating circuit 50 with data is higher, for double pipeline sequencer 200 of FIG. 2.

Typically, double pipeline sequencer 200 includes apparatus and connections identical to the apparatus and connections for the single pipeline sequencer. In addition, however, the double pipeline sequencer includes pipeline register 28 as shown in FIG. 2. Sequencer unit 24 is connected to pipeline register 28 by a data link 44, and pipeline register 28 is coupled to control store memory 20 by data link 46. Data link 42, which exists between sequencer unit 24 and control store memory 20 for single pipeline sequencer 100, is eliminated.

Sequencer unit 24 of double pipeline sequencer 200 also selects an address of a location in control memory 20 having an instruction. As with single pipeline sequencer 100, the selection is in response to a status signal from status select unit 26 and a branch command and jump address from pipeline register 22. Sequencer unit 24 of double pipeline sequencer 200 is not, however, coupled to control store memory 20 and therefore does not operate to access the next instruction line in control store memory 20, and to make the next instruction line available for transfer from control store memory 20. After the address of the location containing the next instruction has been selected by sequencer unit 24, the address of the next instruction is retained in sequencer unit 24 until receipt of the next clock pulse from external timing generator 52.

In response to a clock pulse from external timing generator 52, the address retained in sequencer unit 24 is transferred to pipeline register 28. As described, pipeline register 28 is coupled to control store memory 20 by link 46. The receipt by control store memory 20 of the address of control store memory location containing the next instruction by pipeline register 28 is operative to access the instruction located at that address in control store memory 20 and make the instruction available for transfer from control store memory 20.

The next instruction stored in control store memory 20 is transferred to pipeline register 22 at a next successive clock pulse from timing generator 52. The instruction is then immediately transferred from pipeline register 22 in the same manner as described for conventional single pipeline sequencer 100. Sequencer unit 24 proceeds to select another next address of a control store memory location in which an instruction is stored.

The interval between clock pulses may be shorter for double pipeline sequencer 200 than for single pipeline sequencer 100 because of the inclusion of pipeline register 28. The interval between pulses may be reduced because sequencer unit 24 retains the address of the next instruction selected for transfer to pipeline register 28 at a next pulse. Time need not be allotted within the interval, therefore, for also transferring the selected next instruction address to control store memory 20, and for accessing the next instruction for transfer from control store memory 20. Because the clock pulse interval is shortened, the operating speed of the system is increased.

While pipeline register 28 causes a beneficial increase in the operating speed of the system, pipeline register 28 also detrimentally complicates the instruction lines which may be utilized by the conventional double pipeline sequencer.

Instruction lines are not immediately available for transfer from control store memory 20, after selection by sequencer unit 24. With double pipeline sequencer 200, the instruction at an address sequentially selected by sequencer unit 24 will be available to sequencer unit 24 for the selection of a next address only after the selected address has been transferred first to pipeline register 28 at a clock pulse, and then to pipeline register 22 from control store 20 at a successive clock pulse. It is only at the successive clock pulse which transfers the instruction from control store memory 20 to pipeline register 22 that the memory location data for that instruction becomes available to sequencer unit 24 for use in selecting a successive address of a control store memory location containing an instruction.

FIG. 4 is a chart illustrating the operation of the prior art double pipeline sequencer. As shown, at any given stage of operation, the control store memory location currently accessed is that location which was selected by sequencer unit 24 before the clock pulse transferring the address of that location to pipeline register 28. Pipeline register 22 receives the information from the memory location currently accessed at a next successive clock pulse from external timing generator 52.

Accordingly, the memory location data contained in any instruction cannot be used in the selection of the address for the next instruction. That is, sequencer unit 24 in response to a clock pulse will select a next address while the address last selected, in response to the same clock pulse, is transferred to pipeline sequencer 28. The last address selected, having not yet been transferred to pipeline register 22 at that clock pulse, is not operative to make the memory location information of the last instruction available to sequencer unit 24. The memory location data available to sequencer unit 24 at that clock pulse will be the memory location data contained in the instruction previous to the last instruction selected. Therefore, memory location data indicative of a next instruction to be selected by sequencer unit 24 must be contained in the instruction previous to the last instruction selected by sequencer unit 24 (a memory location data offset of two instructions).

An example of a program segment which could be utilized by a conventional double pipeline sequencer is set forth below (Table 2). The program segment shows addresses for locations in control store memory 20 and the instruction lines contained at each location. Status select commands, where included as part of an instruction, branch commands, and jump addresses are shown.

TABLE 2

| Address | Status Select Command | Branch Command | Jump Address True | False |
|---|---|---|---|---|
| : | : | : | | |
| 148 | — | CONT | 150 | |
| 149 | CNZ | JMP | 151 | 170 |
| 150 | — | CONT | 152 | |
| 151 or 170 | : | : | | |
| : | : | : | | |

The first instruction of the exemplary program segment is located at control store memory location 148. Sequencer unit 24, when provided the CONT branch command of the instruction at location 148, selects the jump address in the "true" column and retains memory location address 150 for later transfer to pipeline register 28. After a clock pulse, memory location 150 is transferred to pipeline register 28. After the same clock pulse, the instruction at location 149 becomes available to sequencer unit 24. The instruction line at location 149 contains a JMP branch command for causing a conditional jump (CNZ) after the instruction at location 150 has been executed.

It should be apparent from the example program segment and previous description that utilizing a double pipeline sequencer requires the use of memory location information in any given instruction which anticipates the instruction to be executed two instructions later. Anticipatory programming of this type is substantially more difficult than programming memory location information just one instruction ahead, as is required with conventional single pipeline sequencer 100.

Accordingly, an object of the present invention is to provide a system for sequentially providing external circuit data for an external circuit, which may be operated utilizing simple programming techniques, while yet operating at high speed.

Additional objects and advantages of the invention will be set forth in the description which follows, and in part will be obvious from the description or may be learned by practice of the invention.

SUMMARY OF THE INVENTION

To achieve the foregoing objects, and in accordance with the purpose of the invention as embodied and broadly described herein, there is provided a system for sequentially providing external circuit data for an external circuit comprising: a memory having a plurality of memory locations identified by addresses, each memory location containing an instruction comprising external circuit data and memory location data, the memory further comprising an address input terminal for currently accessing one of the memory locations in response to receipt of the address for that memory location at the address input terminal; sequencer means, coupled to the memory to receive memory location data from the currently addressed memory location, for selecting the address of another of the memory locations in response to the memory location data; first register means, coupled between the sequencer means and the address input terminal of the memory to receive the address of the other of the memory locations from the sequencer means, for storing the address of the other of said memory locations selected by the sequencer means to make the address available at the address input terminal of the memory to access the other of the memory locations, after the storing; and second register means, coupled between the memory and the external circuit, for storing the external circuit data of the currently accessed memory location for use, after the storing, by the external circuit.

The method for sequentially providing external circuit data for an external circuit, comprises the steps of: currently accessing one of a plurality of memory locations of a memory, each memory location being identified by an address, and containing an instruction comprising external circuit data and memory location data, in response to receipt of the address for the memory location at an address input terminal of the memory; receiving memory location data from the currently accessed memory location and selecting the address of another of the memory locations in response to the memory location data received from the currently accessed memory location; receiving and storing the address of the other of said memory locations, and making the address available at the address input terminal of the memory to access the other of the memory locations, after the receiving and storing; and storing the external circuit data of the currently accessed memory location for use after the storing, by the external circuit.

BRIEF DESCRIPTION OF THE DRAWINGS

FIG. 3 is a chart illustrating the operation of the prior art single pipeline sequencer;

FIG. 4 is a chart illustrating the operation of the prior art double pipeline sequencer;

FIG. 8 is a chart illustrating the operation of the system of the subject invention;

DESCRIPTION OF THE PREFERRED EMBODIMENT

Figure 5:
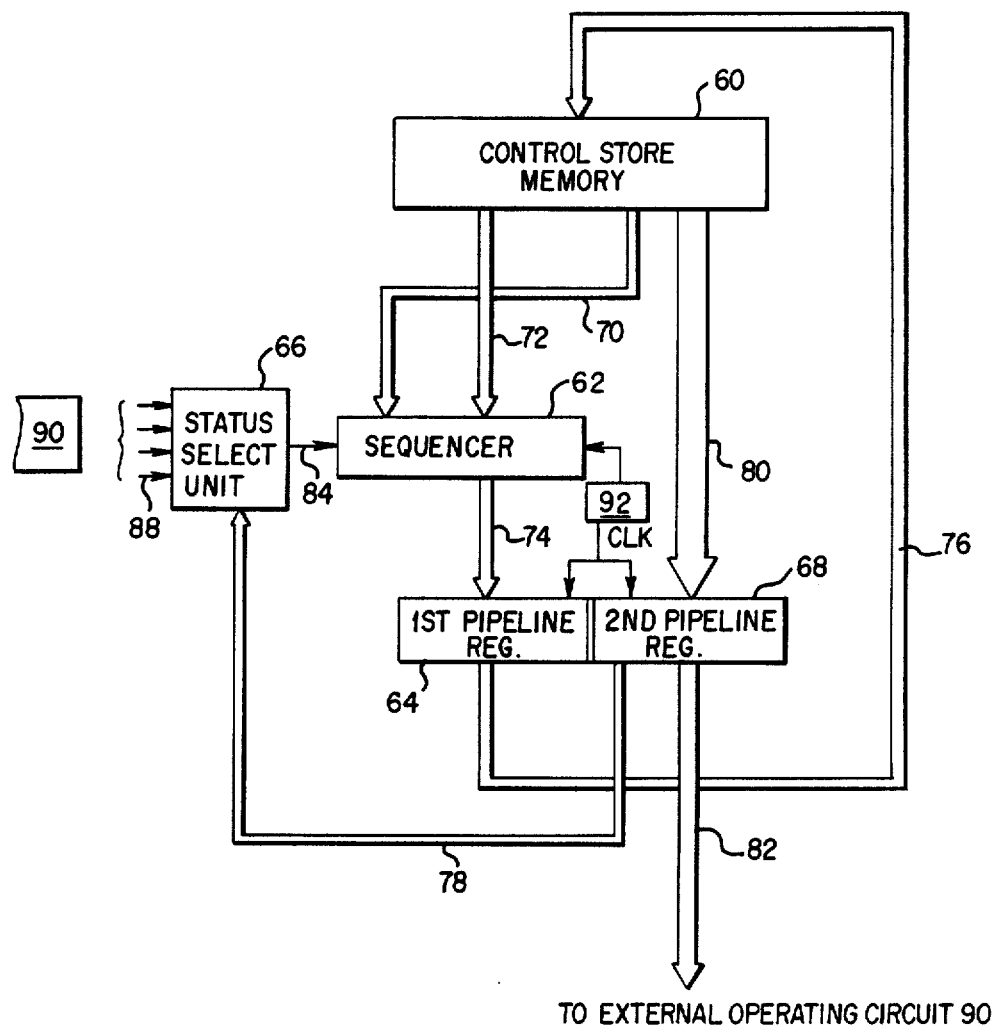
FIG. 5 is a general block diagram of a system for providing external circuit data for an external circuit incorporating the teachings of the subject invention.

Referring to FIG. 5, a system 300 for providing data for an external circuit incorporating the teachings of the subject invention is shown. System 300 includes control store memory 60, sequencer unit 62, first pipeline register 64, status select unit 66, and second pipeline register 68. The system also includes data links 70, 72, 74, 76, 78, 80, 82 and 84. Control store memory 60 is coupled to sequencer unit 62 by data links 70 and 72. Control store memory 60 is also coupled to second pipeline register 68 by data link 80. Sequencer unit 62 is connected to first pipeline register 64 by data link 74. First pipeline register 64 is coupled to control store memory 60 by data link 76. Second pipeline register 68 is coupled to status select unit 66 by data link 78; and status select unit 66 is coupled to sequencer unit 62 by data link 84. Second pipeline register 68 is also connected to an external operating circuit 90 by data link 82.

Control store memory 60 stores sets of instructions, i.e., programs, at locations within control store memory 60 having addresses. Each location in control store memory 60 contains a program line or instruction which includes both external circuit data, as for example, a control command, and memory location data which may comprise a branch command, a jump address and a status select command. First pipeline register 64 stores the address of a memory location in control store memory 60 to be accessed.

In response to a clock pulse from an external timing generator 92, the address to be stored in register 64, which was initially selected by sequencer unit 62, is transferred to first pipeline register 64 over data link 74. From register 64, this address acts as a current address and operates to access the memory location identified thereby. The branch command and jump address of the instruction at the memory location identified by the current address (i.e., the current instruction) are transferred to sequencer unit 62 for use in the selection of a next address, the location of which stores a next instruction. The branch command and jump address are presented to sequencer unit 62 over data links 70 and 72, respectively.

The status select command and control command of the current instruction are transferred to second pipeline register 68 at the same time the branch command and jump address are presented to sequencer unit 62. The status select command and control command of the current instruction are transferred to second pipeline register 68 over data link 80 at a successive clock pulse. Also, in response to the same clock pulse from external timing generator 92, the status select command and control command for a previous instruction last selected by sequencer unit 62 and accessed by first pipeline register 64 are transferred from pipeline register 68. The transfer of the status select command and control command from pipeline register 68 prepares pipeline register 68 to receive the status select command and control command for the current instruction. The status select command of the previous instruction is transferred to status select unit 66 over data link 78. Status select unit 66 receives the status select command of the previous instruction from second pipeline register 68 and also status signals 88 from external operating circuit 90. In response to the status select command received from second pipeline register 68, status select unit 66 selects one of status signals 88 for transfer to sequencer unit 62 over data link 84. The control command of the previous instruction is transferred to external operating circuit 90 over data link 82. The control command comprises external circuit data which may be used in controlling the operation of the external operating circuit 90.

Figure 6:
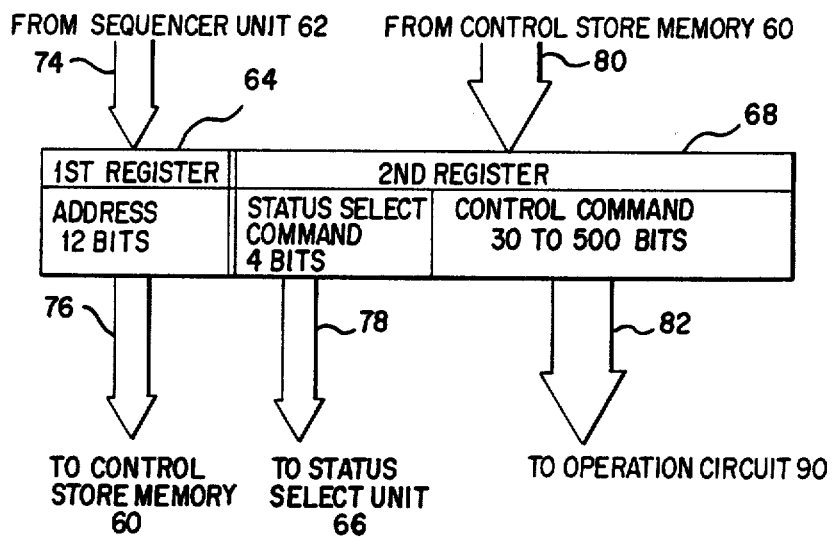
FIG. 6 is an illustration of pipeline registers for use in the system of the subject invention.

The control store memory 60 may have, for example, a capacity of 2K (2048) words. The address of each memory location may contain 12 bits as shown in FIG. 6. Also as depicted in FIG. 6, a status select command may be 4 bits in length, and a control command may have a length from 30 to 500 bits. FIG. 6 shows first pipeline register 64 and second pipeline register 68 as one unit as these registers are shown in FIG. 5.

Figure 7:
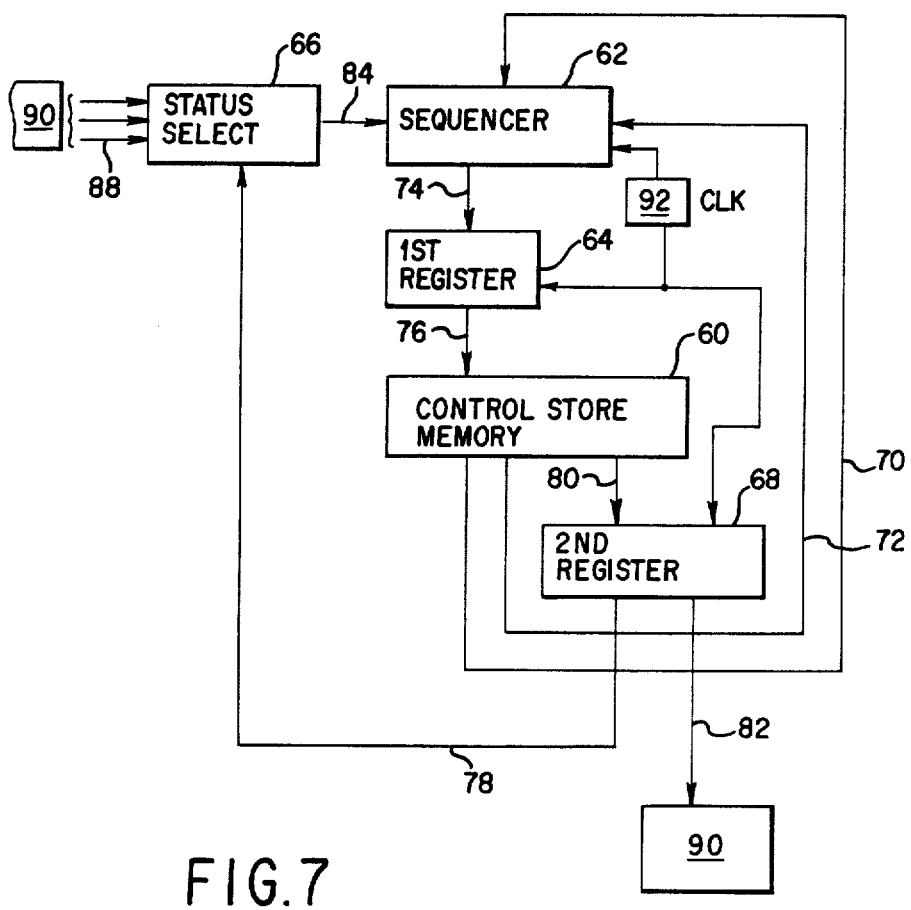
FIG. 7 is another general block diagram of the system of the subject invention shown in FIG. 5.

FIG. 7 is another drawing illustrating the embodiment of the present invention as described in connection with FIG. 5. FIG. 7 emphasizes the flow of memory addresses and the flow of commands and jump addresses by showing first pipeline register 64 and second pipeline register 68 as separate units.

FIG. 8 is a chart illustrating the operation of a preferred embodiment incorporating the teachings of the present invention. As shown, at any given stage of operation, the control memory location currently accessed is that location the address of which currently resides in pipeline register 64. The address of the current location is selected by sequencer unit 62. The control command and status select command stored in pipeline register 68 are contained in the instruction contained in the previous location accessed.

Figure 9:
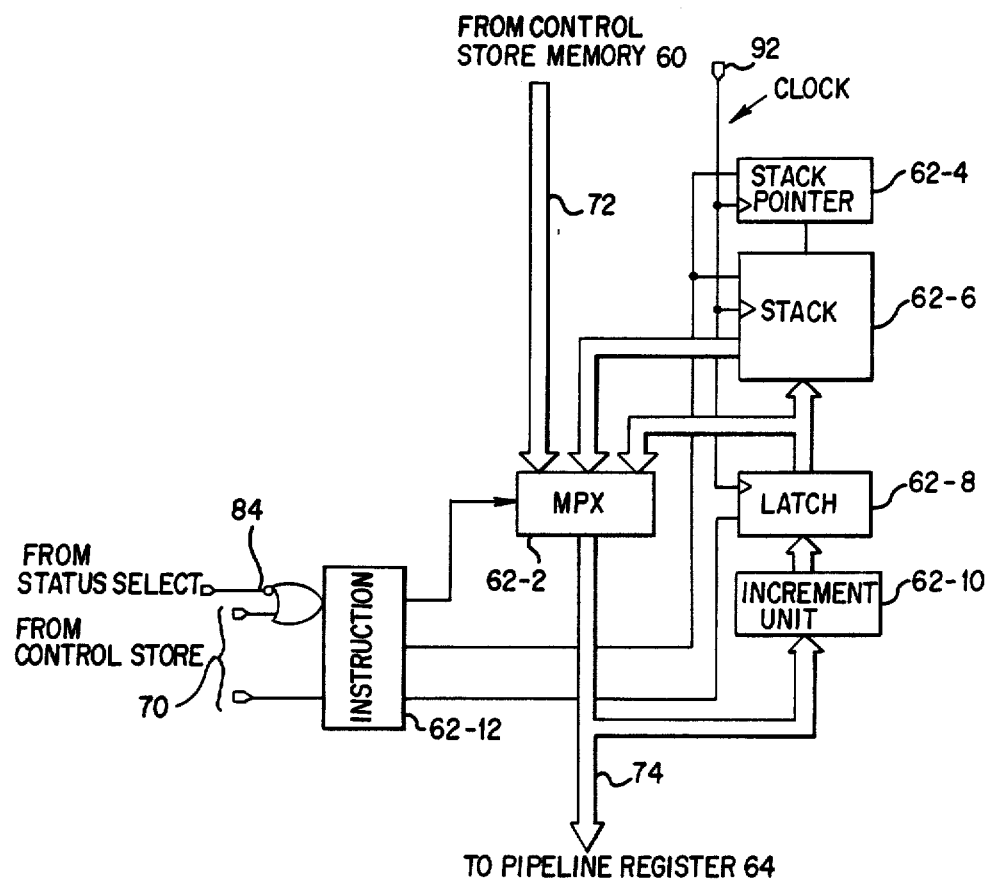
FIG. 9 is a general block diagram of a sequencer unit for use in the system of the subject invention.

FIG. 9 is an exemplary illustration of sequencer unit 62 of system 300. Sequencer unit 62 of FIG. 9 includes multiplexer 62-2, stack pointer 62-4, stack 62-6, latch 62-8, increment unit 62-10, and instruction unit 62-12. Multiplexer 62-2 receives the jump address of the current instruction from control store memory 60 over data link 72. The branch command of the current instruction and the status signal which is selected by status select unit 66 are received over data links 84 and 70, respectively, by instruction unit 62-12 of sequencer unit 62. Instruction unit 62-12 uses the status signal received from status select unit 66 in conjunction with the branch command to control the selection of one of three possible next addresses by multiplexer 62-2.

Multiplexer 62-2 selects either the jump address received from Control store memory 6Q, or a latch address stored in latch 62-8, or a Stack address stored in stack 62-6.

The jump address received from control store memory 60 is part of the current instruction. The jump address indicates, for example, the address to be selected if sequencer unit 62 is to branch to a remote instruction, i.e., an instruction other than the instruction at the next successive memory location.

Increment unit 62-10 receives each address selected by multiplexer 62-2 and increases the received address to the next successive address. The next successive address is supplied to latch 62-8 and becomes the latch address. The latch address is supplied to multiplexer 62-2 for possible selection as a next address. Multiplexer 62-2 selects the latch address as the next address if the branch command as presented to status select unit 66 indicates that the instruction at the next successive memory location is the next instruction to be accessed.

The latch address is also supplied to stack 62-6. The stack is a last-in-first-out (LIFO) device which stores, for example, 10 addresses. Each time multiplexer 62-2 selects a next instruction, the address used to access the next instruction is supplied to latch 62-8 which increments the address, and writes the incremented address to stack 62-6 if the next successive address selected is a jump address. If while selecting successive addresses within the set of instructions starting at the jump address, i.e., a subroutine, a branch command is encountered indicating a return to the address following the last address before the branch to the subroutine, multiplexer 62-2 returns to that address by selecting the stack address. Stack 62-6 stores several addresses so that branching to subroutines may be accomplished within subroutines. Stack pointer 62-4 points to the last address received by stack 62-6.

As an example, if the branch command for the current instruction is a JMP command and the status select command for the previous instruction indicates that the JMP is conditional, the latch address is selected if the condition is not met ("false" condition); the jump address is selected if the condition is met ("true" condition); and when returning from the subroutine starting at the jump address, multiplexer 62-2 selects the stack address.

The next address selected by multiplexer 62-2 is transferred to first pipeline register 64 at a clock pulse from external timing generator 92. At the same time, the control command and status select command for the current instruction are transferred from second pipeline register 68. The status select command is transferred to status select unit 66 for use in determining an address following the next address. The control command is transferred to external operating circuit 90.

An example of a program segment which could be used by a system for providing data for an external circuit is set forth below (Table 3). As will be immediately noted the branch command and jump address for the next instruction will be contained in the current instruction. Thus, the programming difficulties of the conventional double pipeline sequencer are avoided.

TABLE 3

| Address | Status Select Command | Branch Command | Jump Address True | False |
|---|---|---|---|---|
| : | : | : | : | |
| 148 | — | CONT | 149 | |
| 149 | CNZ | CONT | 150 | |
| 150 | — | JMP | 151 | 170 |

TABLE 3-continued

| Address | Status Select Command | Branch Command | Jump Address True | False |
|---|---|---|---|---|
| 151 or 170 | : | : | : | |
| : | : | : | | |

The first instruction of the program segment is located at control store memory location 148. When the control command (not shown here) and the status select command of this instruction are stored in second pipeline register 68 the jump address possibly indicating the next address is at sequencer unit 62. Sequencer unit 62 will have selected a next address by the time external timing generator 92 sends a clock pulse to sequencer unit 62. In this instance, the address selected will be address 149 which is indicated by the jump address and by latch 62-8. For purpose of this example, the jump address and latch address are the same when the branch command is a CONT.

At the next clock pulse from external timing generator 92 the instruction at location 149 is accessed. The branch command and jump address of the instruction at location 149 are transferred to sequencer unit 62. The status select command and control store command of the instruction at location 149 are transferred to second pipeline register 68. Selection of address 150 takes place as it did for address 149. The instruction at location 149 includes a status select command. The status select command is for use in specifying a status signal for the branch command, JMP, appearing in the next instruction at location 150.

Since the status select command is transferred from control store memory 60 to second pipeline register 68 before being transferred from second pipeline register 68 to status select unit 66, the status select command for selectinq a next address must appear in the instruction at the previous location.

Sequencer unit 62 selects a next address after the 150 address in accordance with the branch command and jump address contained in the instruction at that address and according to the status select command which appeared in the instruction at location 149.

As stated, the placement of memory location information i.e., branch commands and jump addresses is simpler than with the conventional double pipeline sequencer. As with the single pipeline sequencer the memory location for the next instruction appears in the current instruction. Also, since sequencer unit 62 retains the next address selected before using the address to access the next control store memory location (this by transfer of the address to pipeline register 64) the interval between clock pulses for the system can be short; the operating speed is therefore high.

Figure 10:
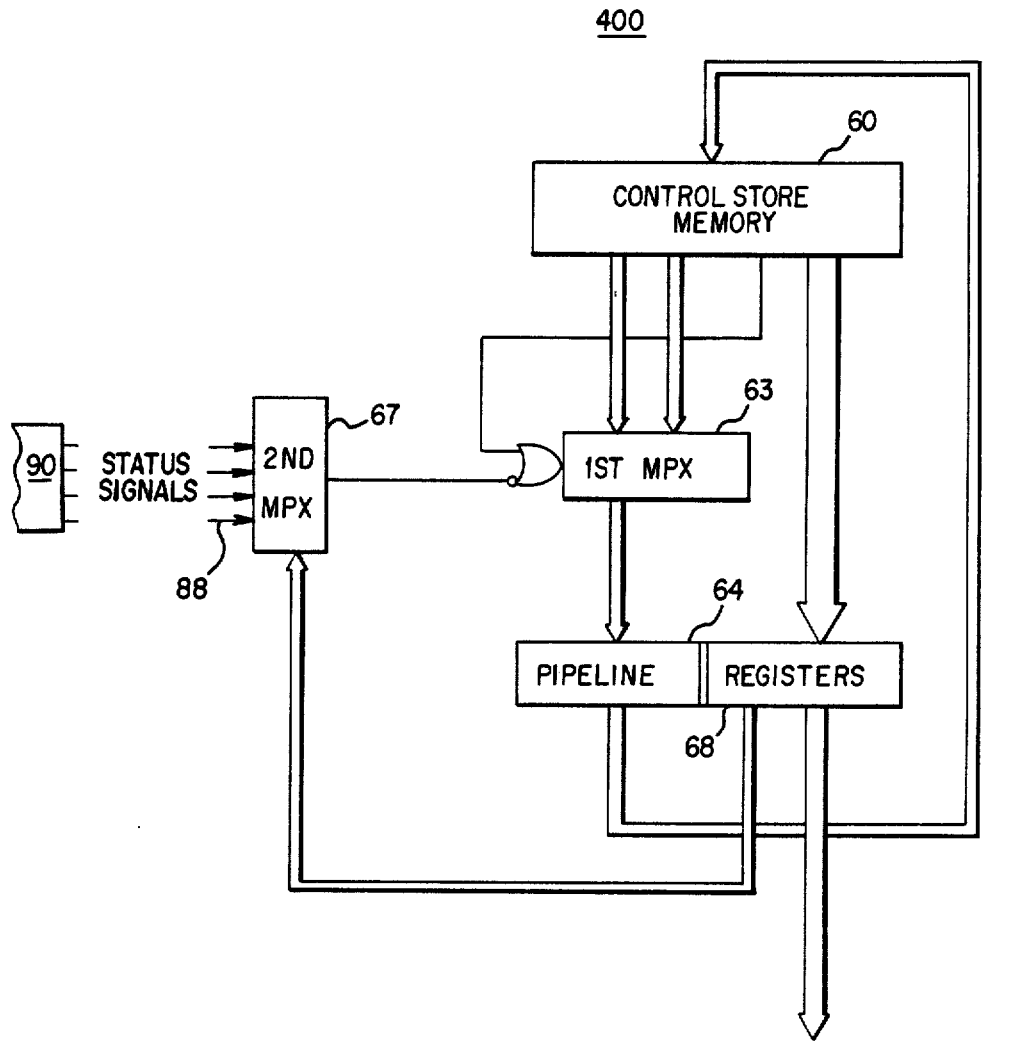
FIG. 10 is a general block diagram of a second preferred embodiment of the system of the present invention.

FIG. 10 is an illustration of another preferred embodiment of the present invention in the form of system 400. Sequencer unit 62 of the preferred embodiment of FIG. 5 is replaced by a first multiplexer 63 and status select unit 66 is replaced by a second multiplexer 67. First multiplexer 63 selects either the memory location having the next successive address or a jump address. The selection is made in accordance with a status signal received from second multiplexer 67 and a branch command from control store memory 60. The preferred embodiment of FIG. 10 may be utilized, for example, as a system for providing microprogramming data to an Arithmetic Logic Unit (ALU).

Figure 1:
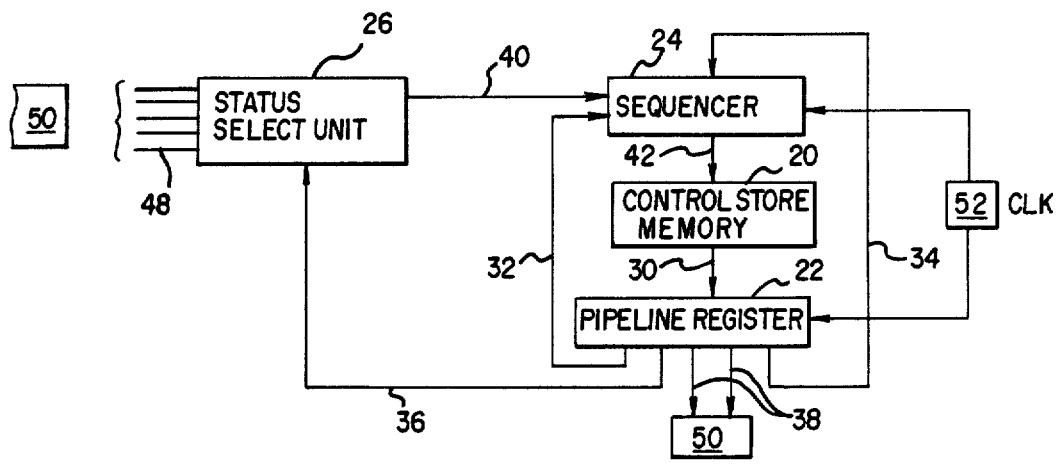
FIG. 1 is a general block diagram of a prior art single pipeline sequencer system for providing external circuit data for an external circuit.
Figure 2:
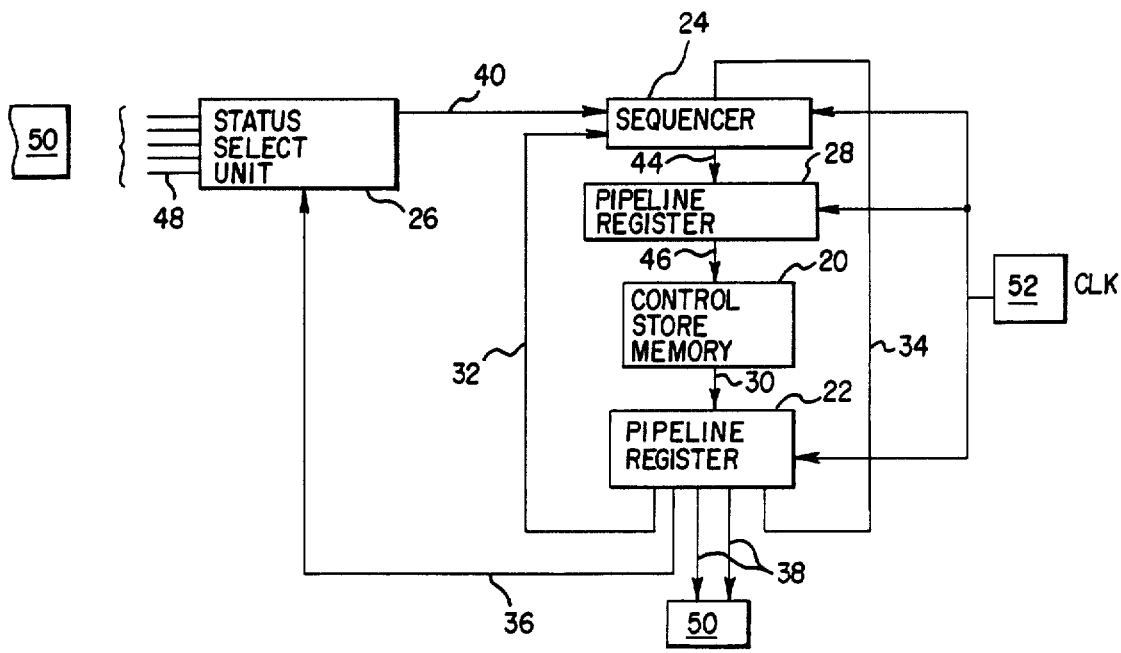
FIG. 2 is a general block diagram of a prior art double pipeline sequencer system for providing external circuit data for an external circuit.
Figure 11:
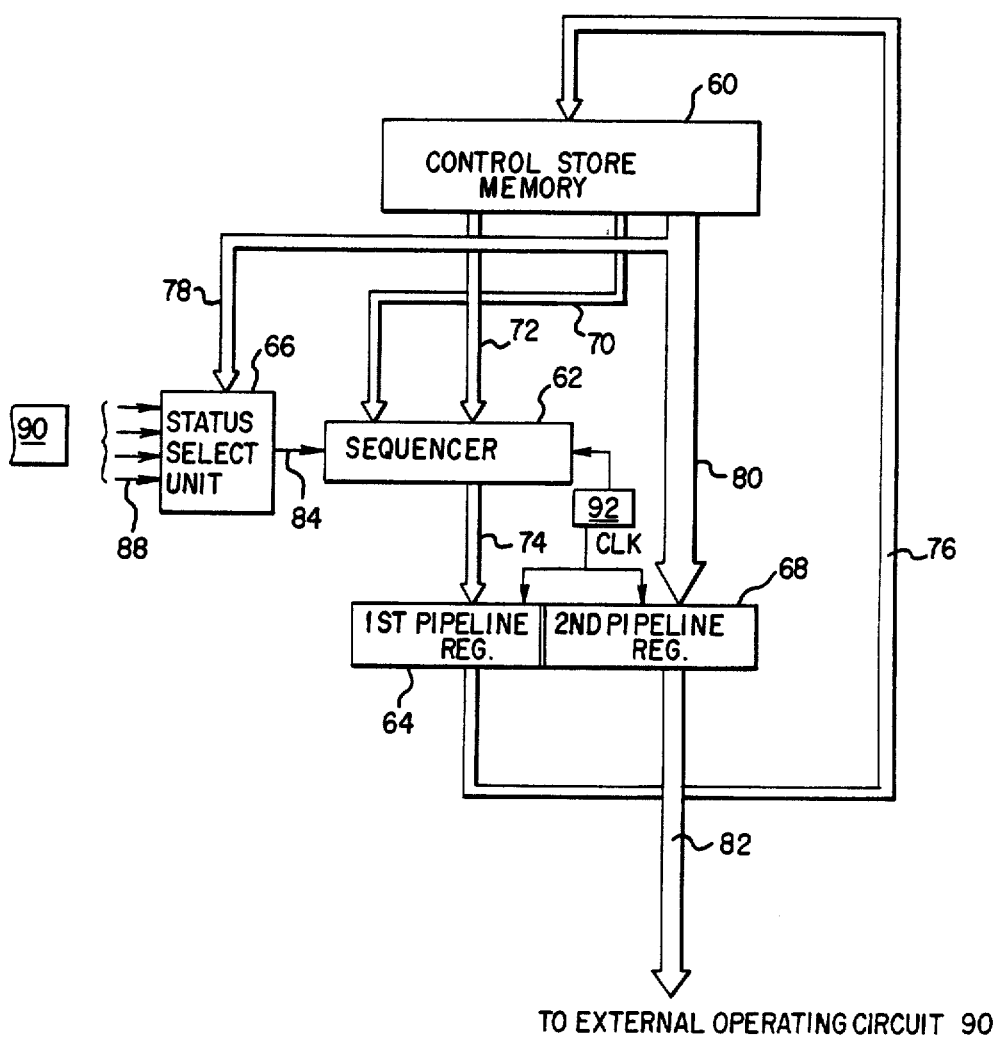
FIG. 11 is a general block diagram of the system of the subject invention showing an alternative embodiment having a direct connection between the control store memory and the status select unit.

For either the first preferred embodiment (FIG. 5) or the second preferred embodiment (FIG. 10) described above, the status select command may also be transferred from the control store memory 60 to status select unit 66 or second multiplexer 67, respectively, without first being transferred to second pipeline register 68. This may be done if the status select unit 66 or second multiplexer 67 experiences a quick response to the status select command received. If the status select command is provided directly from control store memory 60, without first being transferred to second pipeline register 68, the status select command necessary to select the next instruction is included in the present instruction. The programming for the system of the present invention would then be identical to the programming for conventional single pipeline sequencer 100 as illustrated in FIG. 1. FIG. 11 is an illustration of the system of the subject invention having data link 78 for transferring the status select command directly from control store memory 60 to status select unit 66.

It should be understood that the apparatus illustrated in FIGS. 5-10 are merely illustrative of the teachings of the subject invention. Thus, the system may take on different specific forms than those illustratively disclosed with regard to the system of FIGS. 5-10, and yet fully incorporate the teachings of the subject invention.

In view of the foregoing, it should be understood that in addition to disclosure of a system for providing data for an external circuit a related method for sequentially providing external circuit data for an external circuit has been disclosed, comprising the steps of: currently accessing one of a plurality of memory locations of a memory, each memory location being identified by an address and containing an instruction comprising external circuit data and memory location data, in response to receipt of the address for the memory location at an address input terminal of the memory; receiving memory location data from the currently accessed memory location and selecting the address of another of said memory locations in response to the memory location data received from the currently accessed memory location; receiving and storing the address of the other of the memory locations, and making the address available at the address input terminal of the memory to access the other of the memory locations, after the receiving and storing; and storing said external circuit data of said currently accessed memory location for use after the storing, by the external circuit.

It should be apparent to those skilled in the art that various modifications may be made to the system for providing data to an external circuit and related method of the subject invention without departing from the scope or spirit of the invention. Thus, it is intended that the invention cover modifications and variations of the invention, provided they come within the scope of the appended claims and their legally entitled equivalents.

We claim:

1. A system for sequentially providing external circuit data to an external circuit, comprising:

a memory having a plurality of memory locations identified by addresses, each said memory location containing an instruction comprising external circuit data and memory location data, said memory further comprising an address input terminal for currently accessing one of said memory locations in response to receipt of the address for that memory location at said address input terminal;

sequencer means, coupled to said memory, for receiving said memory location data from said currently accessed one of said memory locations, and for selecting the address of another one of said memory locations in response to said memory location data subsequent to receipt of said memory location data from said currently addressed one of said memory locations;

first register means, coupled between said sequencer means and said address input terminal of said memory, for receiving said selected address of said another one of said memory locations from said sequencer means, and for storing said selected address to make said selected address available at said address input terminal of said memory to access said another one of said memory locations; and second register means, coupled between said memory and said external circuit, for receiving said external circuit data from said currently accessed one of said memory locations concurrently with receipt of said memory location data from said currently accessed one of said memory locations by said sequencer means and for storing said external circuit data of said currently accessed memory location in said second register means, for use, after said storing, be said external circuit.

2. A system of claim 1 further comprising: control means, responsive to said external circuit data of said currently accessed memory location, for controlling the selection of said address of said another one of said memory locations by said sequencer means.

3. A system of claim 2, wherein said control means is coupled between said second register means and said sequencer means.

4. A system of claim 2, wherein said control means includes said sequencer means and a status select unit connected thereto.

5. A system of claim 1, wherein said sequencer means comprises:

means for receiving said memory location data from said currently accessed one of said memory locations and increment means for incrementing said address of said currently accessed one of said memory locations to achieve an incremented address;

latch means connected to said increment means for storing said incremented address;

a last-in-first-out stack connected to said latch means for storing said incremented address when said incremented address is not selected as said address of said another one of said memory locations, as a stack address;

means for selecting between the address associated with said memory location data of said currently accessed one of said memory locations, said incremented address, and said stack address in response to said external circuit data to determine said address of said another one of said memory locations.

6. A system of claim 2 wherein:

said sequencer means comprises a first multiplexer; and said control means comprises a second multiplexer.

7. A method for sequentially providing external circuit data to an external circuit, comprising the steps of:

currently accessing one of a plurality of memory locations of a memory, each said memory location being identified by an address and containing an instruction comprising external circuit data and memory location data, in response to receipt of the address for said one memory location at an address input terminal of said memory;

receiving said memory location data from said currently accessed one of said memory locations and subsequently selecting the address of another of said memory locations in response to said memory location data;

receiving and storing said selected address of said another of said memory locations, and making said selected address available at said address input terminal of said memory to access said another of said memory locations, after said receiving and storing said selected address step; and receiving said external circuit data from said currently accessed one of said memory locations concurrently with said receiving said memory location data step and storing said external circuit data of said currently accessed one of said memory locations for use after said storing of said external circuit data, by said external circuit.

8. A method of claim 7, wherein said step of selecting the address of said another of said memory locations comprises the substeps of:

receiving said external circuit data of said currently accessed one of said memory locations;

receiving said location data of said currently accessed one of said memory locations; and selecting the address of another of said memory locations in response to said memory location data and said external circuit data.

9. A method of claim 8, wherein said external circuit data of said currently accessed one of said memory locations is received directly from said memory.

10. A method of claim 7, wherein said step of selecting the address of said another of said memory locations comprises the substeps of:

receiving external circuit data of a previously accessed one of said memory locations;

receiving said memory location data of said currently accessed one of said memory locations; and selecting the address of another of said memory locations in response to said memory location data of said currently accessed one of said memory locations and said external circuit data of said previously accessed one of said memory locations.

11. A method of claim 7, wherein said step of selecting the address of said another of said memory locations comprises the substeps of:

receiving an address of said currently accessed one of said memory locations and incrementing said address of said memory location to achieve an incremented address;

storing said incremented address in a latch;

storing said incremented address in a stack as a stack address when said incremented address is not selected as said another address; and selecting between an address contained in said memory location data of said currently accessed memory location, said incremented address, and said stack address in response to said external circuit data to determine said address of said another memory location.

* * * * *

UNITED STATES PATENT AND TRADEMARK OFFICE
CERTIFICATE OF CORRECTION

PATENT NO. :  4,884,196

DATED  :  November 28, 1989

INVENTOR(S) :  Geoffrey L. Thiel et al

It is certified that error appears in the above-identified patent and that said Letters Patent is hereby corrected as shown below:

Claim 1, Column 12, Line 26, "be" should be --by--.

Signed and Sealed this

Thirtieth Day of June, 1992

Attest:

DOUGLAS B. COMER

Attesting Officer

Acting Commissioner of Patents and Trademarks